ically cut teeth, as will be fully described hereinafter.

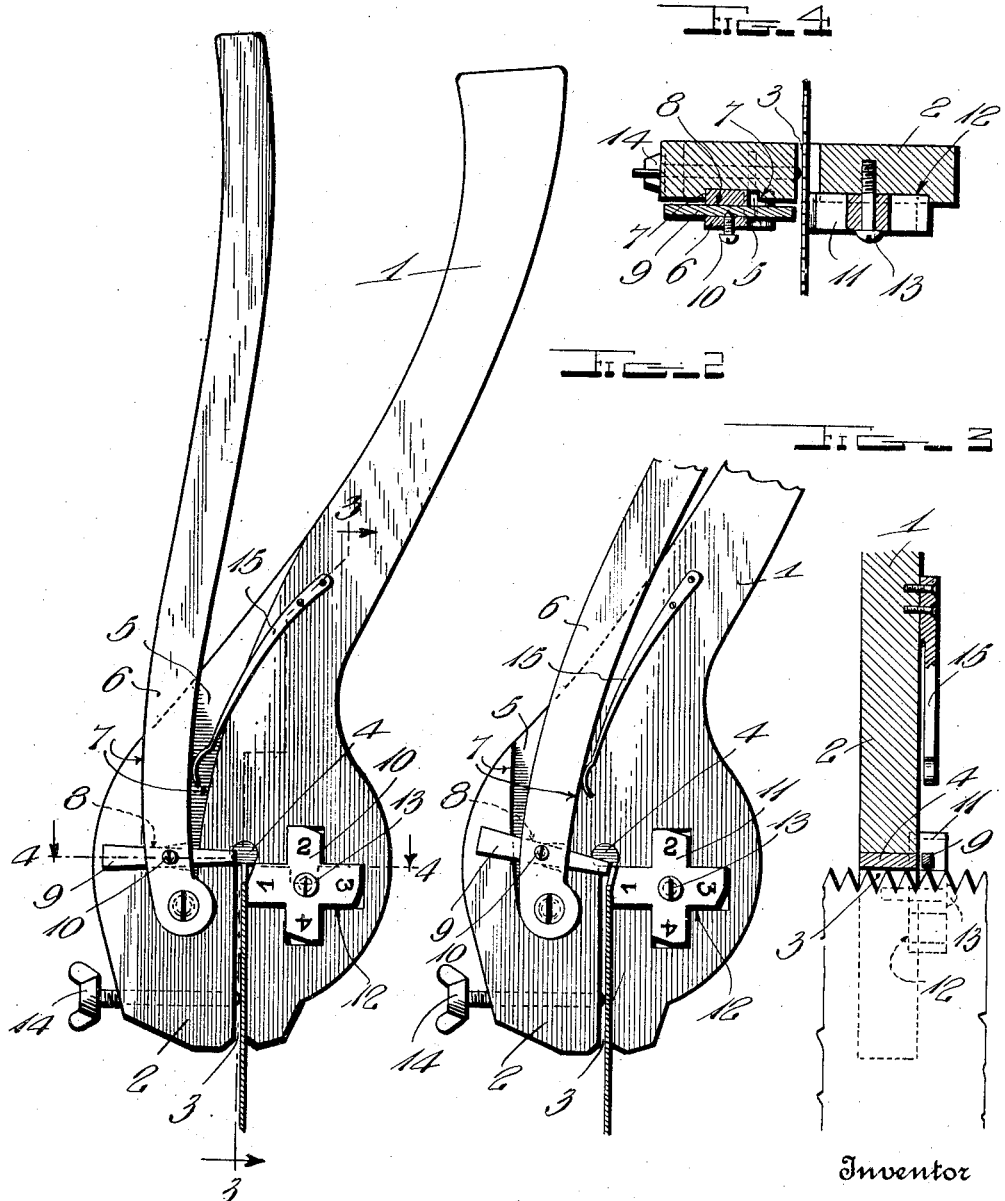

UNITED STATES PATENT OFFICE.

CHARLES A. JOHNSON, OF CLARK FORK, IDAHO.

SAW-SET.

1,374,743.　　Specification of Letters Patent.　　Patented Apr. 12, 1921.

Application filed April 19, 1920. Serial No. 375,079.

*To all whom it may concern:*

Be it known that I, CHARLES A. JOHNSON, a citizen of the United States, residing at Clark Fork, in the county of Bonner and State of Idaho, have invented certain new and useful Improvements in Saw-Sets; and I do declare the following to be a full, clear, and exact description of the invention, such as will enable others skilled in the art to which it appertains to make and use the same.

This invention relates to an improved saw set.

The object of the invention is to generally improve upon and simplify the construction of a saw set so that it may be more easily manipulated; it being of such construction that it may be used to set either fine or coarse teeth at the proper angle, according to their size.

Other objects and advantages of the invention will be apparent during the course of the following description.

In the accompanying drawings forming a part of this specification and in which like numerals are employed to designate like parts throughout the same;

Figure 1 is a side elevation of a saw set constructed in accordance with my invention, the operating lever being shown in the position it assumes when it is ineffective.

Fig. 2 is a view like Fig. 1, disclosing the position of the lever when it is effective.

Figs. 3 and 4 are views taken on the lines 3—3 and 4—4 respectively of Fig. 1.

In the drawings wherein for the purpose of illustration is shown a preferred embodiment of my invention, the numeral 1 designates a handle or shank, at one end of which is a head 2. The latter is provided with a slot 3, which extends from its outer edge toward its center, into which the blade of the saw is inserted. This slot is enlarged slightly at its opposite ends, the enlargement at the outer end forming a guide entrance for the saw, while the one at the inner end forms a clearance space for the teeth, there being a buffer 4 in this clearance space. The buffer is merely a plug of soft metal such as lead, against which the teeth of the saw strike when the saw is inserted in the slot, the purpose being to prevent injury of the teeth which would otherwise occur. During the setting of the teeth they are constantly in contact with the lead plug, consequently, protection thereof is assured. The enlargement of the slot at its inner end not only provides a seat for the buffer 4, but it also forms a clearance space for the teeth of the saw to pass through. A recess 5 is formed in the head and a hand-actuated-lever 6 is pivoted therein, its movement in opposite directions being limited by the spaced shoulders 7 formed by the recess 5. Extending transversely through the lever 6 adjacent its pivoted end is an opening 8 into which a reversible hammer or bit 9 is placed, the latter being held against displacement by a set screw 10. This hammer is to be brought against the teeth of the saw which are set by means of the anvil 11 which is removably secured to the head 2. While the anvil may be of any other design, I prefer to make it in the shape of a cross, and to retain it in place, I form a recess 12 in the head into which it is placed. As before stated, it is the real purpose of this invention to construct the device in such a way that it will effectively set various types of saw teeth, whether they are large or small. It is well known that the number of teeth that a saw has and the size of the teeth are governed according to the particular work to be done with the saw. For instance, the rip saw is provided with coarse teeth, rather large in size, and about four or five teeth to the inch. Other types of saws have more or less teeth ranging from four to sixteen to the inch. Necessarily these teeth vary in length and size and a great many saw sets fail, in that they do not effectively accommodate these various sizes of teeth, therefore, I have designed my anvil so that it will accomplish this feature. Examination of the same will disclose the fact that one corner of each arm of the cross is cut or beveled off, each bevel being of a slightly different length and inclination from the others so as to properly angle and accommodate the various sizes of saw teeth. As shown, there is only one corner of each arm cut off, but I desire it to be understood that both corners may be removed if desired or necessary. When both corners are removed it will be necessary to reverse the anvil to use four of the corners, as is obvious. I have found that, under ordinary circumstances, this anvil will accommodate many of the common fine tooth saws. However, in order to adapt the device for rip saws and buck saws, I will make use of an additional anvil, equipped with coarser bevels. It is to be stated here, that I design my anvil for the purpose of setting saw teeth at various angles, and to effectively do this, I provide a proper bearing surface for setting teeth of various lengths which, due to the usual saw sets, become damaged or broken because of the insufficient bearing surface on the anvil. In other words, if rather long teeth are to be set, the arm of the anvil containing the properly cut corner, or say the longest bevel, will be brought into place, while if small teeth are to be set, the anvil will be changed to accommodate them. In carrying out this feature I provide the arms of the anvil with indications, such as numerals from 1 to 4 so that by using a guide book which will accompany each device, a person may properly set any sized teeth in the manner hereinafter set forth. If a saw having sixteen teeth to the inch is to be set, then the arm having the numeral 1, which is for small teeth will be moved to operative position, whereas, if extremely coarse teeth are to be set, an arm having a larger numeral thereon, will be moved to effective position. Hence, by referring to the book of rules, a person may readily learn just what arm of the anvil is to be used with a particular type of saw. The anvil is held against displacement by a screw 13, which construction permits it to be readily and easily adjusted or reversed.

Attention is directed to the construction of the hammer 9, which as before stated is reversible. It is to be noted that it is shaped somewhat like a wedge, the purpose being to make its opposite ends of different sizes, so that when a coarse tooth is being set the widest end may be brought into use. On the other hand, the small end will be used with fine teeth. This feature of construction insures against breakage of the teeth which might otherwise happen. For example, suppose a coarse tooth were being set and the small end of the hammer used. It is apparent that under the above circumstances the hammer, presenting such a small surface of contact, would not effectually set the tooth and would in all probability injure the same. On the other hand, the construction of my hammer will enable me to bring the large end thereof into use when a large tooth is being acted on, and vice versa. Consequently, my device is advantageous in this respect also.

For the purpose of holding the saw properly during the period of use, I employ a set screw 14. Also, in order to force the lever 6 away from the handle 1 after each operation I employ a spring 15.

Assuming that coarse saw teeth are to be set, the anvil will be arranged so that the arm having the indication 4 thereon, (which is the proper one for this type of teeth) will be in effective position. The blade of the saw will then be inserted in the slot 3 until the teeth engage the lead plug 4. Then the hammer 9 will be reversed for the purpose already set forth, whereupon the lever 6 will be actuated to bend the teeth down on the bevel corner of this arm. In this way the teeth will be given their proper angle according to their size. Every other tooth will be operated on in the above manner and then the saw will be reversed to set the remaining teeth. Of course, in all instances the set screw 14 will be used to steady the tool and permit it to be quickly moved along the saw blade. To set smaller teeth the anvil will be changed by simply removing the screw 13.

A saw set constructed in accordance with the foregoing description will enable a person to properly set any type of saw and obtain the proper angling or as nearly correct as is possible. For instance, a man has a saw which he wants to set but does not know just how to properly set it. He may do so with my saw set by first referring to the book of rules to find out what arm of the anvil should be placed in position for, say a saw having ten teeth to the inch. After he finds that out, the rest is easy because with the anvil in the designated position the proper angle will be imparted to the teeth. Injury of the teeth of the saw is prevented by use of the soft metal plug. The tool is easy to manipulate and is practical and is inexpensive.

In view of the foregoing it is believed that a clear understanding of the invention will be had, therefore a more lengthy description is deemed unnecessary.

It is to be understood that the form of my invention herein shown and described is to be taken as a preferred embodiment of the same, and that various changes in the shape, size, and arrangement of parts may be resorted to without departing from the spirit of the invention or the scope of the subjoined claims.

I claim:

1. A saw set including a handle having a slot at its outer end for reception of the saw, a lever pivoted to said handle adjacent the slot, an anvil carried by the handle and positioned on a side of the slot opposite to that of the pivotal connection of the aforesaid lever, said anvil having a plurality of teeth-bearing-surfaces of varied inclinations, said lever being formed adjacent the pivot with a transverse slot, and a tapered removable and reversible hammer arranged in and held in said slot, being coöperative with the aforesaid teeth-bearing-surfaces.

2. A saw set comprising a handle provided with a slotted head at its outer end, an anvil movably mounted on said head adjacent the slot, including a plurality of radial arms formed at their outer ends with beveled teeth-bearing-surfaces, the beveled surfaces of the various arms being of different inclinations to accommodate different sizes of saw teeth, a lever pivotally mounted on the head, and a teeth engaging hammer carried by the lever for bending the teeth against one of said beveled surfaces.

3. A saw set comprising a handle having a bifurcated head on one end, between the furcations of which a saw blade is to be inserted, an anvil detachably connected to the head, said anvil being in the form of a cross, each of the arms of which is provided with a beveled surface, each of said surfaces being of different lengths and inclinations from the others so as to accommodate many sizes of saw teeth, a lever pivotally mounted on said head, a spring to hold the lever normally inoperative, and a reversible hammer carried by the lever for bending the saw teeth against said inclined surfaces.

In testimony whereof I have hereunto set my hand.

CHARLES A. JOHNSON.